United States Patent [19]

Dougnier et al.

[11] Patent Number: 5,385,717

[45] Date of Patent: * Jan. 31, 1995

[54] PROCESS FOR THE SYNTHESIS OF ZEOLITES HAVING AN ALUMINOSILICATE FRAMEWORK BELONGING TO THE FAUJASITE STRUCTURAL FAMILY, PRODUCTS OBTAINED AND THEIR USE IN ADSORPTION AND CATALYSIS

[75] Inventors: François Dougnier, Illzach; Jean-Louis Guth, Brunstatt; Joël Patarin, Mulhouse; Didier Anglerot, Lons, all of France

[73] Assignee: Societe Nationale Elf Aquitaine, Courbevoie, France

[*] Notice: The portion of the term of this patent subsequent to Mar. 24, 2009 has been disclaimed.

[21] Appl. No.: 933,031

[22] Filed: Aug. 20, 1992

[30] Foreign Application Priority Data

Aug. 28, 1991 [FR] France ................ 91 10691

[51] Int. Cl.$^6$ .................. C01B 33/26; B01J 29/08
[52] U.S. Cl. ................ 423/702; 423/328.2; 502/64; 502/79
[58] Field of Search ........... 423/702, DIG. 21, 328.2; 502/64, 79

[56] References Cited

U.S. PATENT DOCUMENTS 5,098,686  3/1992  Delprato et al. ............... 423/702

*Primary Examiner*—Anthony McFarlane
*Attorney, Agent, or Firm*—Burgess, Ryan and Wayne

[57] ABSTRACT

An aluminosilicate gel containing a structuring agent ST and having a composition appropriate for crystallizing as a zeolite of the faujasite structural family is prepared and then subjected to a crystallization to form a zeolite precursor consisting of the said zeolite containing the structuring agent ST in its cavities and channels, and zeolite is produced by calcination of the said precursor. The structuring agent ST consists of at least one compound chosen from the polyalkylene oxides of the formula $$R-O-[C_mH_{2m-1}X-O]_n-R'$$

in which R and R', which are identical or different, each represent H or a $C_1$ to $C_4$ alkyl radical, X denotes H or OH, m is equal to 2 or 3 and may be different from one unit to the next and n is a number larger than 12 and preferably between 25 and 800. The zeolites obtained have a Si:Al ratio which is larger than 1 and may exceed 3 and they have a cubic symmetry. These zeolites are usable, directly or after cation exchange, as adsorbents or as catalyst components.

28 Claims, No Drawings

PROCESS FOR THE SYNTHESIS OF ZEOLITES HAVING AN ALUMINOSILICATE FRAMEWORK BELONGING TO THE FAUJASITE STRUCTURAL FAMILY, PRODUCTS OBTAINED AND THEIR USE IN ADSORPTION AND CATALYSIS

FIELD OF THE INVENTION

The invention relates to a process for the synthesis of zeolites having an aluminasilicate framework belonging to the faujasite structural family. It also relates to the products obtained and to their use in adsorption and catalysis.

BACKGROUND OF THE INVENTION

Zeolites are crystallised tectosilicates. The structures consist of assemblies of $TO_4$ tetrahedra forming a three-dimensional framework by the sharing of oxygen atoms. In zeolites of the aluminosilicate type which are the most common, T represents tetravalent silicon as well as trivalent aluminium. The three-dimensional framework mentioned above exhibits cavities and channels which possess molecular dimensions and receive cations which compensate the charge deficit linked with the presence of trivalent aluminium in $TO_4$ tetrahedra, the said cations being in general exchangeable.

As a general rule, the composition of zeolites may be represented by the empirical formula ($M_{2/n}0$, $Y_2O_3$, $xZO_2$) in their dehydrated and calcined state. In this formula Z and Y denote respectively the tetravalent and trivalent elements of the $TO_4$ tetrahedra, M denotes an electropositive element of valency n such as an alkali metal or an alkaline earth metal and constitutes the compensation cation and x is a number which may vary from 2 to theoretical infinity, in which case the zeolite is a silica.

Each type of zeolite possesses a distinct microporous structure. The variation of the micropore dimensions and forms from one type to the other leads to changes in the adsorbing properties. Only molecules which have certain dimensions and forms are able to penetrate into pores of a specific zeolite. Owing to these remarkable characteristics, zeolites are particularly adapted to the purification or separation of liquid or gaseous mixtures, for example the separation of hydrocarbons by selective adsorption.

The chemical composition, with, in particular, the nature of the elements present in the TO4 tetrahedra and the nature of the exchangeable compensation cations, is also an important factor involved in the selectivity of adsorption and above all in the catalytic properties of these products. They are used as catalysts or catalyst supports in the cracking, reforming and modification of hydrocarbons as well as in the synthesis of many molecules.

RELATED ART

Many zeolites are found in nature, they are aluminosilicates whose availability and properties do not always correspond to the requirements of industrial applications. As a result, the search for products having new properties has led to the synthesis of a large variety of zeolites of which zeolite A (U.S. Pat. No. 2,882,243), zeolite X (U.S. Pat. No. 2,882,244) and zeolite Y (U.S. Pat. No. 3,130,007) may be mentioned.

The zeolites of the faujasite structural family are characterised by a structure having a three-dimensional framework which may be described by assembly of modules called cubo-octahedra. Each of these modules consists of 24 tetrahedra containing the Si and Al elements in our case and bridged by oxygen according to the principle described above. In the cubo-octahedron, the tetrahedra are linked so as to form eight cycles with six tetrahedra and six cycles with four tetrahedra.

Each cubo-octahedron is linked, within the framework of tetrahedral coordination, through four cycles with six tetrahedra, to four neighbouring cubo-octahedra.

To show the relationships which link the various members of the structural family, it is convenient to consider the structural planes in which the cubo-octahedra are arranged at the apexes of a plane network of hexagons. Each cubo-octahedron is also linked to three neighbours in the structural plane.

The fourth bond direction is directed alternately on one side and on the other side of the structural plane and permits the linking of cubo-octahedra between neighbouring and parallel structural planes.

All the solids belonging to the faujasite structural family possess interconnected channels having a diameter of approximately 0.8 nm. Faujasite is thus a zeolite having an aluminosilicate framework whose structure corresponds to the stacking of three distinct structural planes, ABC corresponding to a structure of cubic symmetry.

It is possible by synthesis from an aluminosilicate gel to obtain compounds of the same structure as faujasite.

The general process for the synthesis of zeolites having an aluminosilicate framework belonging to the faujasite structural family consists in a hydrothermal crystallisation of sodium aluminosilicate gels of specific compositions and containing a structuring agent consisting of a metal cation.

More precisely such a process consists in making first of all a reaction mixture having a pH larger than 10 and containing water, a source of tetravalent silicon, a source of trivalent aluminium, a source of hydroxide ions in the form of a strong base, a source of metal cations $M^{n+}$, n being the valency of M, in such a way as to obtain an aluminosilicate gel having the composition required to permit its crystallisation as a compound of the faujasite structural family, and then maintaining the gel obtained, directly or after preliminary maturing, at a temperature at most equal to 150° C. and under a pressure at least equal to the autogenous pressure of the mixture consisting of the said gel for a duration sufficient to carry out the crystallisation of this gel.

As indicated above, such a process does not permit the synthesis of zeolites with an aluminosilicate framework having the structure of cubic symmetry of faujasite and a Si/Al ratio larger than 3.

French Patent Application No. 89 11949 describes the synthesis of the faujasite characterised by Si/Al ratios which may be larger than 3, by using as structuring agent monomethyl ethers of polyethylene glycol whose molecular weight varies between 200 and 350, which corresponds to 4 and 8 units of ethylene oxides.

BRIEF DESCRIPTION OF THE INVENTION

It has now been found that the polyalkylene oxides of a much higher molecular mass have also the property of orienting the crystallisation of aluminosilicate gels towards zeolites of the faujasite structural family characterised by Si/Al ratios which may be larger than 3.

The use of these polyalkylene oxides of high molecular mass improves the quality of the crystals obtained. The quality of the crystals of a zeolite has an influence on its stability as well as on its efficiency as catalyst absorbent.

All these polyalkylene oxides of high molecular mass are manufactured in industry and are therefore easily accessible.

The object of the invention is therefore a process for preparing zeolites having an aluminosilicate framework belonging to the faujasite structural family and exhibiting a Si/Al ratio which is larger than 1 and may exceed 3, the said process being of the type which consists, first of all, in making a reaction mixture having a pH larger than 10 and containing water, a source of tetravalent silicon, a source of trivalent aluminium, a source of hydroxide ions in the form of a strong base and a structuring agent ST in such a way as to obtain an aluminosilicate gel having the composition required to permit its crystallisation as a compound of the faujasite structural family, then maintaining the gel obtained, optionally after preliminary maturing, at a temperature at most equal to 150° C. and under a pressure at least equal to the autogenous pressure of the mixture consisting of the said gel for a period of time sufficient to carry out the crystallisation of this gel as a zeolite precursor consisting in the zeolite trapping the structuring agent ST in its cavities, and in subjecting the said precursor to a calcination to destroy the structuring agent and to produce zeolite, and it is characterised in that the structuring agent ST consists of at least one compound chosen from the polyalkylene oxides corresponding to the formula

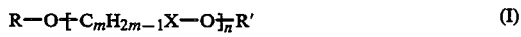

$$R-O+C_mH_{2m-1}X-O+_nR' \quad (I)$$

in which R and R' which are identical or different, each represent a hydrogen atom or a $C_1$ to $C_4$ alkyl radical, X denotes a hydrogen atom or an —OH radical, m is equal to 2 or 3 and may be different from one unit to the next, and n is a number larger than 12, in general between 25 and 800 and preferably between 40 and 600.

DETAILED DESCRIPTION OF THE INVENTION

The quantity of structuring agent ST present in the reaction mixture intended to form the gel is advantageously such that the molar ratio $ST:Al^{III}$ ranges from 0.1 to 4, the said ratio ranging preferably from 0.1 to 2.

In particular, the ingredients making up the reaction mixture giving rise to the aluminosilicate gel are employed in such a way that the said gel has, in terms of molar ratios, the following composition:

|  | Advantageous intervals | Preferred intervals |
|---|---|---|
| $Si^{IV}:Al^{III}$ | 2 to 20 | 4 to 10 |
| $OH^-:Al^{III}$ | 2 to 12 | 3 to 10 |
| $ST:Al^{III}$ | $1.10^{-4}$ to 4 | $1.10^{-3}$ to 2 |
| $H_2O:Al^{III}$ | 40 to 200 | 50 to 150 |

Examples of structuring agents corresponding to formula in (I) are polyethylene oxides, polypropylene oxides, poly(ethylene/propylene) oxides and their monomethyl and dimethyl ethers.

The use of structuring agents according to the invention leads to the formation of zeolites having the structure of cubic symmetry of faujasite.

Finely divided solid silicas in the form of hydrogels, aerogels or colloidal suspensions, water-soluble silicates such as alkali metal silicates such as sodium silicate, the hydrolysable silicate esters such as tetraalkylorthosilicates of formula $Si(OR)_4$ in which R denotes a $C_1$ to $C_4$ alkyl such as methyl or ethyl may be mentioned as sources of tetravalent silicon $Si^{IV}$ usable in the preparation of the reaction mixture intended to form the aluminosilicate gel.

The source of silicon is used in the form of a true aqueous solution, in the case of water-soluble silicates or of an aqueous suspension which may be colloidal, in the case of finely divided silicas.

Materials suitable as sources of trivalent aluminium $Al^{III}$ are aluminium salts such as aluminium sulphate, nitrate, chloride, fluoride, acetate, oxides and hydroxides, aluminates and especially alkali metal aluminates such as sodium aluminate, and aluminium esters such as aluminium trialkoxides of formula $Al(OR)_3$ in which R denotes a $C_1$ to $C_4$ alkyl radical such as methyl, ethyl or propyl.

The source of hydroxide ions is chosen from strong inorganic bases, especially hydroxides of the alkali metals of group IA of the Periodic Table of Elements and hydroxides of the alkaline earth metals Ca, Sr and Ba, and the strong organic bases, especially quaternary ammonium hydroxides, preference being given to the inorganic bases especially to sodium hydroxide NaOH.

The reaction mixture intended to form the aluminosilicate gel may also contain cations $M^{n+}$ of at least one metal M, of valency n, other than metals whose hydroxides are strong bases, in total amounts such that the molar ratio $M^{n+}:Al^{aIII}$ is at most equal to 0.4 and preferably at most equal to 0.3. The said cations $M^{n+}$ are introduced into the said reaction mixture in the form of salts such as sulphates, nitrates, chlorides or acetates or else in the form of oxides.

Mixing of the ingredients constituting the reaction mixture intended to form the aluminosilicate gel may be carried out in any order whatever.

The said mixing is advantageously carried out by first of all preparing at room temperature a basic aqueous solution containing a strong base, the structuring agent ST and the cations $M^{n+}$ if they are used, and then incorporating into this solution an aqueous solution of the source of trivalent aluminium and an aqueous solution or a suspension, colloidal or not, of the source of tetravalent silicon. The pH of the reaction mixture, whose value is larger than 10, is preferably in the vicinity of 13.5. Before initiating gel crystallisation, crystallisation nuclei may be added to the reaction mixture intended to form the said gel in a quantity advantageously ranging from 0.1% to 10% by weight of the reaction mixture.

The nuclei may be produced by milling a zeolite of the faujasite type, that is to say of the same type as the crystalline phase to be produced. In the absence of addition of nuclei, it is advantageous to subject the aluminosilicate gel, formed from the reaction mixture, to maturing in a closed vessel at a temperature below the crystallisation temperature for a period which can range from approximately 6 hours to approximately 6 days. The said maturing may be carried out in static conditions or with stirring. Crystallisation of the aluminosilicate gel, with or without nucleus, takes place by heating the reaction mixture at a temperature of not more than 150° C. and preferably ranging from 90° C. to 120° C. and at a pressure corresponding at least to the autogenous pressure of the reaction mixture forming the gel. The heating period needed for the crystallisation depends on the composition of the gel and on the crystallisation temperature. It ranges generally from 2 hours to 30 days.

The crystals obtained, referred to as zeolite precursors and consisting in zeolite trapping the structuring agent and the hydration water of the cations in its pores and cavities, are separated from the crystallisation medium by filtration, then washed with distilled or deionised water until aqueous washings become slightly basic i.e. have a pH lower than 9. The washed crystals are then dried in an oven at a temperature of between 50° C. and 100° C. and preferably in the region of 70° C.

The zeolite is obtained from the precursor crystals by subjecting the said crystals to a calcination at a temperature above 300° C. and preferably between 400° C. and 700° C. for a period of time sufficient to remove the structuring agent and hydration water of the cations contained in the precursor.

As indicated above, the zeolites prepared by the process according to the invention have Si/Al ratios which are larger than 1 and may exceed 3 and exhibit a structure of cubic symmetry of the type of that of faujasite.

The characterisation of the products according to the invention, namely the precursors stemming from the crystallisation and the zeolites themselves resulting from the calcination of the precursors, may be carried out by means of the following techniques:
Electron Microscopy Under the electron microscope, the products of cubic structure show themselves in forms compatible with cubic symmetry (for instance regular octahedra).
X-ray Diffraction Diagram This diffraction diagram is obtained by means of a diffractometer by employing the conventional powder method with copper $K_\alpha$ radiation.

An internal standard makes it possible to determine accurately the values of the angles $2\theta$ associated with the diffraction peaks. The various interlattice distances ($d_{hkl}$), characteristic of the sample, are calculated from the Bragg relationship.

An estimate of the measurement error $\Delta(d_{hkl})$ on $d_{hkl}$ is calculated, as a function of the absolute error $\Delta(2\theta)$ affecting the measurement of $2\theta$, by the Bragg relationship.

In the presence of an internal standard, this error is minimised and taken to be ordinarily equal to $\pm 0.05°$. The relative intensity I/Io assigned to each $d_{hkl}$ is estimated from the height of the corresponding diffraction peak. A scale of symbols is employed to characterise this relative intensity as follows: VS=very strong, S=strong, mS=moderately strong, m=medium, mw=moderately weak, w=weak and vw=very weak.
Thermogram The thermograms carried out on the samples of products make it possible to quantify the number of molecules of structuring agent and the number of molecules of water which are contained in one unit cell of the structure.
Carbon 13 NMR Carbon 13 NMR using incrossed polarisation with rotation to the magic angle carried out on the samples of the precursor makes it possible to confirm the presence of the structuring agent in the cavities of the product.
Determination of the Si:Al Ratio It can be carried out by means of one of the following techniques:
chemical analysis
Silicon 29 NMR The zeolites according to the invention of the faujasite type are of the cubic structure having a value of the parameter a of the unit cell between 2.4 and 2.5 nm, the following formula referred to one unit cell (assembly of 192 tetrahedra) may be given to these cubic zeolites $$(vM_1^{q+})(wM^{n+})((SiO_2)_{192-x}(AlO_2)_x)^{x-}, (zH_2O)$$

with, in this formula, $M_1^{q+}$ denoting a q-valent cation of a metal of the group IA of the Periodic Table of Element (q=1) or of an alkaline earth metal chosen from Ca, S and Ba (q=2) or a monovalent cation containing nitrogen (q=1), in particular ammonium or quaternary ammonium, $M^{n+}$ denoting a metal cation of valency n other than a cation $M_1^+$, x, z, w and v being numbers such that $38 < x \leq 96$, $z \geq 0$ depending on the hydration state of the zeolite (z=0 for a completely anhydrous zeolite), $$0 < v \leq x/q \text{ and } 0 < w \leq x/n \text{ with } qv+wn \geq x$$

Table I below shows the X-ray diffraction diagram characteristic of cubic zeolites of the faujasite type after calcination of the products at 500° C. for 4 hours.

The $d_{hkl}$ column gives the mean values of the interlattice distances. Each of these values must be assigned with the measurement error $\Delta(d_{hkl})$ of between $\pm 0.1$ and $\pm 0.004$.

The variations which can be observed with respect to these mean values are essentially linked to the nature of the compensation cations and to the Si/Al ratio of the zeolite. The same remarks are to be applied to the relative intensities I/Io.

TABLE I

| 2θ(degrees) | $d_{hkl}$ ($10^{-1}$ nm) | (hkl) | I/Io |
|---|---|---|---|
| \multicolumn{4}{X-ray diffraction diagram of the zeolites after calcination} |
| 6.24 | 14.1 ± 0.2 | 111 | VS |
| 10.18 | 8.68 | 220 | mf |
| 11.93 | 7.41 | 311 | mS |
| 15.70 | 5.63 ± 0.1 | 331 | S |
| 18.74 | 4.73m | 511 | S |
| 20.41 | 4.34m | 440 | S |
| 21.35 | 4.15 | 531 | w |
| 22.84 | 3.88 | 620 | m |
| 23.70 | 3.75 | 533 | S |
| 23.98 | 3.70 | 622 | mw |
| 25.07 | 3.54 | 444 | w |
| 25.84 | 3.44 | 551 | mw |
| 27.10 | 3.287 ± 0.02 | 642 | mS |
| 27.82 | 3.204 | 731 | m |
| 29.68 | 3.006 | 733 | m |

The precursors of zeolites which are produced during the crystallisation stage of the process according to the invention and whose calcination leads to zeolites whose formulae have been defined above, are crystalline aluminosilicates having a Si:Al ratio which is larger than 1 and may exceed 3, which have the cubic structure of faujasite corresponding to an X-ray diffraction diagram comparable to that given in Table II and which possess cavities trapping molecules of structuring agent ST, which are chosen from the polyalkylene oxides the formula of which has been defined above.

TABLE II

X-ray diffraction diagram of the zeolite precursor

| 2θ(degrees) | $d_{hkl}$ ($10^{-1}$ nm) | (hkl) | I/Io |
|---|---|---|---|
| 6.27 | 14.08 ± 0.21 | 111 | vS |
| 10.19 | 8.66 | 220 | mS |
| 11.95 | 7.39 | 311 | mS |
| 15.70 | 5.63 ± 0.1 | 331 | S |
| 17.73 | 4.99 | 422 | w |
| 18.72 | 4.73 | 511 | mS |
| 20.41 | 4.34 | 440 | mS |
| 21.16 | 4.15 | 531 | w |
| 22.84 | 3.89 | 620 | m |
| 23.71 | 3.74 | 533 | S |
| 23.97 | 3.70 | 622 | mw |
| 25.02 | 3.55 | 444 | vw |
| 25.83 | 3.44 | 551 | mw |
| 27.10 | 3.287 ± 0.02 | 642 | mS |
| 27.81 | 3.205 | 731 | mw |
| 29.70 | 3.005 | 733 | m |

The zeolites obtained by the process according to the invention are usable in the same types of application as the zeolites of similar structure and of comparable or smaller Si:Al ratio prepared by similar or different methods.

The zeolites obtained according to the invention are thus suitable as adsorbent to carry out the selective adsorption of molecules whose dimensions are smaller than 0.8 nm or else, after having been subjected to exchange reactions with various cations, as catalysts or catalyst components usable in the reactions of catalytic conversion of organic compounds and especially of hydrocarbonaceous compounds. For instance, by exchange treatment with ammonium cations followed by calcination, it is possible to obtain the protonated form of the zeolite. This form as well as those resulting from an exchange treatment with rare earth cations such as lanthanum are appropriate as acid catalysts for the hydrocracking of oil feedstocks. The zeolites may also be subjected to exchange treatment with cations of metals of the groups II to VIII of the Periodic Table of Elements to form products appropriate as hydrocarbon conversion catalysts. For their applications as catalysts, the zeolites modified by exchange with cations conferring on them catalytic properties may be used alone or in the form of composite products resulting from the mixture of these modified zeolites with other catalytically active products and/or with an amorphous matrix such as a silica gel or else a mixed gel of silica and of another oxide such as magnesia, alumina, titanium oxide, zirconium oxide, the said matrix being used to endow the catalyst with, among other things, better thermal stability.

The composite catalysts associating one or more catalytically active zeolites to a matrix based on silica gel or on a mixed gel of silica and of another oxide are particularly appropriate for moving bed or fluid bed operations as they can easily be shaped into grains having the required dimensions for these operations, for example by spray drying an aqueous suspension of the ingredients they are composed of.

The following examples are given without any implied limitation to illustrate the invention.

In these examples, the quantities and percentages are given by weight unless stated otherwise.

EXAMPLE 1

An aluminosilicate gel was prepared first of all by operating as follows in a vessel of appropriate capacity, the contents of the said vessel being kept stirred throughout the operation.

8.1 parts of water, 0.53 part of sodium hydroxide NaOH and, after dissolution of the sodium hydroxide, 1 part of structuring agent consisting of polyethylene oxide of number-average molecular mass Mn equal to 3400 (POE 3400) were introduced into the vessel. After total dissolution, 0.91 part of sodium aluminate containing 56% of $Al_2O_3$ and 37% of $Na_2O$ was added to the contents of the vessel.

After obtaining a clear solution, 7.5 parts of a colloidal suspension of silica containing 40% of $SiO_2$ and 60% of water were then introduced into the vessel.

An aluminosilicate gel was thus obtained, the molar composition of which, based on one mole of $Al_2O_3$ follows:

10 $SiO_2$; 1 $Al_2O_3$; 2.4 $Na_2O$; 0.0588 "$POE_{3400}$"; 140 $H_2O$

The gel obtained was subjected to maturing at room temperature for 24 hours in a sealed vessel. The matured gel was then placed in an autoclave and maintained at 100° C. in the latter for 7 days to form a crystallised product. The crystals obtained were separated from the reaction medium by filtration, then washed with distilled water to low basicity (pH below 9) of the aqueous washes and finally dried in an oven at approximately 80° C.

The dried crystals were then calcined at 500° C. for 4 hours in order to eliminate the molecules of the structuring agent used and to obtain the zeolite.

Before calcination, the crystallised product exhibits an X-ray diffraction diagram comparable to that given in Table II, the said product having moreover a Si:Al ratio equal to 3.5 and containing in its micropores water molecules and structuring agent molecules. The occluded species in the micropores of the zeolite (water and structuring agent) represent 25.5% of the zeolite precursor.

The zeolite formed by calcination of the above crystallised product exhibits an X-ray diffraction diagram comparable to that given in Table I.

The formula found for this zeolite, referred to one cubic unit cell of 192 tetrahedra, is written in the anhydrous state as

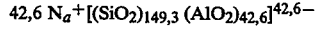

EXAMPLE 2

The operation was carried out as indicated in Example 1, however replacing the structuring agent with polyethylene oxide of number-average molecular mass Mn equal to 2000 (POE 2000).

The aluminosilicate gel, before maturing, had the following molar composition:

10 $SiO_2$; 1 $Al_2O_3$; 2.4 $Na_2O$; 0.1 "POE 2000"; 140 $H_2O$. Before calcination, the crystallised product exhibits an X-ray diffraction diagram similar to that given in Table II. The presence of a low quantity of gmelinite type impurity (5%) may, however, be observed.

The said product has a Si:Al ratio equal to 3.4 and contains in its micropores water molecules and molecules of the structuring agent used. The occluded species in the zeolite micropores before calcination (water and structuring agent) represent 25.7% of the zeolite precursor.

The zeolite formed by calcination of the crystallised precursor product exhibits an X-ray diffraction diagram similar to that given in Table I.

The formula found for this zeolite, based on a cubic unit cell of 192 tetrahedra, is written in the anhydrous state as

$43,6\ Na^+[(SiO_2)_{148,4}\ (AlO_2)_{43,6}]^{43,6-}$

EXAMPLE 3

An aluminosilicate gel was first of all prepared by operating as follows in a vessel of appropriate size, the content of the said vessel being kept stirred for the duration of the operation.

32.4 parts of water, 2.10 parts of sodium hydroxide NaOH and, after dissolution of the sodium hydroxide, 4 parts of structuring agent consisting of the polyethylene oxide of number-average molecular mass Mn equal to 8000 (POE 8000) were introduced into the vessel. After dissolution, 3.64 parts of sodium aluminate containing 56% of $Al_2O_3$ and 37% of $Na_2O$ were then added to the contents of the vessel. 30 parts of a colloidal silica suspension consisting of 40% of $SiO_2$ and 60% of water were then introduced into the vessel after homogenisation.

An aluminosilicate gel was thus obtained, whose molar composition, based on one mole of $Al_2O_3$, was as follows:

10 $SiO_2$; 1 $Al_2O_3$; 2.4 $Na_2O$; 0.025 "POE 8000"; 140 $H_2O$. The gel obtained was subjected to maturing at room temperature for 24 hours in a closed vessel. The matured gel was then placed in an autoclave and kept at 100° C. in the latter for 7 days to form a crystallised product.

The crystals formed were separated from the reaction mixture by filtration, then washed with distilled water to low basicity (pH below 9) of the aqueous washes and were finally dried in an oven at approximately 80° C.

The dried crystals were then calcined at 500° C. for 4 hours in order to eliminate the molecules of the structuring agent used and to obtain the zeolite.

Before calcination, the crystallised product exhibits an X-ray diffraction diagram similar to that given in Table II. The presence of gmelinite (<5%) may however be noted.

This product has moreover a Si:Al ratio of 3.5 and contains in its micropores water molecules and molecules of the structuring agent used. The occluded species in the micropores of the zeolite ($H_2O$ and structuring agent) represent 24.9% of the zeolite precursor.

The zeolite formed by calcination of the above precursor product exhibits an X-ray diffraction diagram comparable to that of Table I.

The formula found for this zeolite, based on a cubic unit cell of 192 tetrahedra, is written in the anhydrous state as:

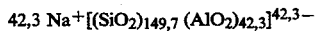
$42,3\ Na^+[(SiO_2)_{149,7}\ (AlO_2)_{42,3}]^{42,3-}$

EXAMPLE 4

The operation was carried out as indicated in Example 1 with, however, the following variations in the operating conditions gel preparation: 1 part of structuring agent consisting of the polyethylene oxide of number-average molecular mass Mn equal to 10,000 (POE 10,000).

crystallisation: 10 days at 100° C.

Before maturing, the aluminosilicate gel had the following molar composition based on 1 mole of $Al_2O_3$:

10 $SiO_2$; 2.4 $Na_2O$; 1 $Al_2O_3$; 0.02 "$POE_{1000}$"; 140 $H_2O$

After calcination, the crystallised product exhibits an X-ray diffraction diagram similar to that of Table II. The presence of gmelinite (approximately 5%) may, however, be noted. The said product has moreover a Si:Al ratio equal to 3.4 and contains in its micropores water molecules and molecules of the structuring agent used. The occluded species in the micropores of the zeolite ($H_2O$ and structuring agent) represent 25.8% of the zeolite precursor.

The zeolite formed by calcination of the above precursor product exhibits an X-ray diffraction diagram comparable to that of Table I.

The formula found for this zeolite, based on a cubic unit cell of 192 tetrahedra, is written in the anhydrous state as:

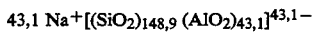
$43,1\ Na^+[(SiO_2)_{148,9}\ (AlO_2)_{43,1}]^{43,1-}$

EXAMPLE 5

An aluminosilicate gel was prepared first of all by introducing into a vessel with stirring 32.4 parts of water and 4 parts of a structuring agent consisting of polyethylene oxide of number-average molecular mass Mn equal to 20,000 (POE 20,000). After obtaining a clear solution, 2.1 parts of sodium hydroxide NaOH were added, then, after dissolution, 3.64 parts of sodium aluminate containing 56% of $Al_2O_3$ and 37% of $Na_2O$ were added. After homogenisation of the mixture, 30 parts of a colloidal silica suspension containing 40% of $SiO_2$ and 60% of water were introduced into the vessel.

An aluminosilicate gel was thus obtained, whose molar composition, based on one mole of $Al_2O_3$, was as follows:

10 $SiO_2$; 1 $Al_2O_3$; 2.4 $Na_2O$; 0.01 "POE 20,000"; 140 $H_2O$.

The gel obtained was kept at room temperature for 24 hours in a closed vessel.

The matured gel was then placed in an autoclave and kept at 100° C. for 12 days to form a crystallised product.

The resulting product was then separated from the reaction mixture by filtration, then washed with distilled water until the aqueous washings were of a pH lower than 9, and then dried in an oven at approximately 80° C.

The product obtained exhibits an X-ray diffraction diagram corresponding to that of a zeolite of the faujasite type, with, however, the presence of gmelinite type impurity (about 10%).

EXAMPLE 6

This example illustrates the possibility of using nuclei of a preceding preparation in the reaction mixture, in order to decrease substantially the duration of synthesis.

The aluminosilicate gel was prepared by operating as indicated in Example 1. The molar composition of the gel, based on one mole of $Al_2O_3$, is repeated 10 $SiO_2$; 1 $Al_2O_3$; 2.4 $Na_2O$; 1 "POE 3400"; 140 $H_2O$ The gel obtained was subjected to maturing at room temperature for 24 hours in a closed vessel.

Moreover, nuclei were prepared by subjecting the faujasite crystals obtained in Example 1 to an ultrasound treatment.

0.15 part of the germs thus prepared was then added to the matured gel. The mixture thus obtained was then kept in an autoclave heated to 100° C. for a period of 108 hours.

The crystals obtained were separated from the reaction mixture, then washed, dried and calcined as indicated in Example 1.

Before calcination, the crystallised product exhibits an X-ray diffraction diagram comparable to that given in Table II, the said product having moreover a Si:Al ratio equal to 3.5 and containing in its micropores water molecules and molecules of structuring agent. The occluded species in the micropores of zeolite (water and structuring agent) represent 25.2% of the zeolite precursor. The zeolite formed by calcination of the above crystallised product exhibits an X-ray diffraction diagram comparable to that given in Table I.

The formula found for this zeolite, based on a cubic unit cell of 192 tetrahedra, is written in the anhydrous state as:

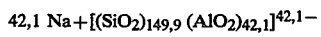

$42,1\ Na+[(SiO_2)_{149,9}\ (AlO_2)_{42,1}]^{42,1-}$

What is claimed is:

1. In a process for preparing a zeolite having an aluminosilicate framework belonging to the faujasite structural family and having a Si:Al ratio greater than 1 in which a reaction mixture having a pH greater than 10, containing water, a source of tetravalent silicon $Si^{IV}$, a source of trivalent aluminium $Al^{III}$, a source of hydroxide ions in the form of a strong base and a structuring agent ST is formed to provide an aluminosilicate gel having a composition required to obtain after crystallization of the gel a compound of the faujasite structural family; maintaining the gel at a temperature not higher than 150° C. and under a pressure at least equal to the autogenous pressure of the mixture for a period of time sufficient to crystalline the gel to form a zeolite precursor; containing the structuring agent ST and calcining the zeolite precursor to destroy the structuring agent thereby forming the zeolite, the improvement which comprises using a structuring agent ST comprising at least one linear polyalkylene oxide of the formula

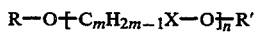

$R-O+C_mH_{2m-1}X-O+_n R'$ in which R and R', which are identical or different, each represents hydrogen or a $C_1$ to $C_4$ alkyl group, X is hydrogen or an —OH group, m is 2 or 3 and varies within the same linear polyalkylene oxide, and n is a number greater than 12.

2. A process of claim 1, wherein n is a number ranging from 25 to 800.

3. A process of claim 1 wherein the quantity of structuring agent ST in the reaction mixture is such that the molar ratio $ST:Al^{III}$ ranges from $1\times10^{-4}$ to 4.

4. A process of claim 1 wherein the components $Si^{IV}$, $Al^{III}$, —OH, ST and $H_2O$ comprising the reaction mixture giving rise to the aluminosilicate gel are present in quantities that the molar ratio of components in the gel composition are $Si^{IV}:Al^{III}$ from 2 to 20, —OH:$Al^{III}$ from 2 to 12, $ST:Al^{III}$ from $1\times10^{-4}$ to 4 and $H_2O:Al^{III}$ from 40 to 200.

5. A process of claim 4, wherein the molar ratios of the components in the reaction mixture are $Si^{IV}:Al^{III}$ from 4 to 10, —OH:$Al^{III}$ from 3 to 10, $ST:Al^{III}$ from $1\times10^{-3}$ to 2 and $H_2O:Al^{III}$ from 50 to 150.

6. A process of claim 1 wherein the structuring agent ST consists of at least one compound selected from the group consisting of polyethylene oxides, polypropylene oxides, poly(ethylene/propylene) oxides and their monomethyl and dimethyl ethers.

7. A process of claim 1 wherein the source of tetravalent silicon is selected from the group consisting of finely divided silicas in the form of hydrogels, aerogels and colloidal suspensions, water-soluble silicates, and hydrolysable silicate esters.

8. A process of claim 1 wherein the source of trivalent aluminium is selected from the group consisting of aluminium salts, aluminium oxides and hydroxides, aluminates, and aluminium esters.

9. A process of claim 1 wherein the source of hydroxide ions is selected from the group consisting of hydroxides of alkali metals of group IA of the Periodic Table of Elements, hydroxides of alkaline earth metals Ca, Sr and Ba and strong organic bases.

10. A process of claim 1 wherein the reaction mixture contains $M^{n+}$ cations of at least one metal M, of valency n, other than the metals whose hydroxides are strong bases, in a quantity such that the $M^{n+}:Al^{III}$ molar ratio in the mixture is not greater than 0.4.

11. A process of claim 1 wherein before initiating gel crystallisation, crystallisation nuclei in an amount ranging from 0.1% to 10% by weight of the reaction mixture are added to the reaction mixture, the crystallisation nuclei being specifically produced by milling a zeolite of the same type as the crystalline phase to be produced.

12. A process of claim 1 wherein before initiating gel crystallisation, the gel is subjected to maturing, in a closed vessel, at a temperature below the crystallisation temperature for a period ranging from about 6 hours to about 6 days.

13. A process of claim 1 wherein the crystallisation of aluminosilicate gel, with or without nucleus, is carried out by maintaining the gel at a temperature ranging from 90° C. to 120° C. for a period of between 2 hours and 30 days.

14. A process of claim 1 wherein the zeolite precursor is calcined at a temperature above 300° C.

15. A process of claim 1, wherein n is a number of from 40 to 600.

16. A process of claim 1 wherein the quantity of structuring agent ST in the reaction mixture is such that the molar ratio $ST:Al^{III}$ ranges from $1\times10^{-3}$ to 2.

17. A process of claim 7 wherein the silicate esters comprise at least one tetraalkylorthosilicate of the formula $Si(OR)_4$ wherein R is a $C_1$ to $C_4$ alkyl group.

18. A process of claim 8 wherein the aluminate comprises sodium aluminate.

19. A process of claim 8 wherein the aluminum esters comprise $Al(OR)_3$ wherein R is a $C_1$ to $C_4$ alkyl group.

20. A process of claim 10 wherein the molar ratio of $M^{n+}:Al^{III}$ is not higher than 0.3.

21. A process of claim 14 wherein the precursor is calcined at a temperature of from 400° C. to 700° C.

22. A process of claim 1 wherein the zeolite has an Si:Al ratio above 3.

23. A zeolite precursor having an aluminosilicate framework belonging to the faujasite structural family consisting of aluminosilicates having a Si:Al ratio which is greater than 1 having a structure of cubic symmetry comparable to that of faujasite and exhibiting cavities trapping the molecules of a structuring agent ST, wherein the structuring agent consists of at least one linear polyalkylene oxide of the formula

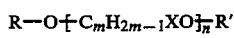

in which R and R', which are identical or different, each represent hydrogen or a $C_1$ to $C_4$ alkyl group, X is hydrogen or a hydroxyl group, m is 2 or 3 and varies within the same polyalkylene oxide, and n is a number larger than 12.

24. A precursor of claim 23, wherein n is a number ranging from 25.

25. A precursor of claim 23 wherein the structuring agent ST consists of at least one compound selected from the group consisting of polyethylene oxides, polypropylene oxides, poly(ethylene/propylene) oxides and their monomethyl and diethyl ethers.

26. A precursor of claim 23 wherein the precursor exhibits an X-ray diffraction diagram as shown in Table II:

TABLE II

| 2θ(degrees) | $d_{hkl}$ ($10^{-1}$ nm) | (hkl) | $I/I_o$ |
|---|---|---|---|
| 6.27 | 14.08 ± 0.21 | 111 | VS |
| 10.19 | 8.66 | 220 | mS |
| 11.95 | 7.39 | 311 | mS |
| 15.70 | 5.63 ± 0.1 | 331 | S |
| 17.73 | 4.99 | 422 | w |
| 18.72 | 4.73 | 511 | mS |
| 20.41 | 4.34 | 440 | mS |
| 21.16 | 4.15 | 531 | w |
| 22.84 | 3.89 | 620 | m |
| 23.71 | 3.74 | 533 | S |
| 23.97 | 3.70 | 622 | mw |
| 25.02 | 3.55 | 444 | vw |
| 25.83 | 3.44 | 551 | mw |
| 27.10 | 3.287 ± 0.02 | 642 | mS |
| 27.81 | 3.205 | 731 | mw |
| 29.70 | 3.005 | 733 | m |

27. A zeolite precursor of claim 23 having an Si:Al ratio greater than 3.

28. A zeolite precursor of claim 24 wherein the number n is from 40 to 600.

* * * * *